United States Patent [19]

Gurries

[11] 4,320,807

[45] Mar. 23, 1982

[54] RESONANT SYSTEM SUPPORT

[75] Inventor: Raymond A. Gurries, Reno, Nev.

[73] Assignee: Resonant Technology Company, Sparks, Nev.

[21] Appl. No.: 128,608

[22] Filed: Mar. 10, 1980

[51] Int. Cl.³ .......................... B06B 1/16; F16H 33/20

[52] U.S. Cl. ...................................... 173/49; 74/1 SS; 74/61; 366/116

[58] Field of Search .................... 74/1 SS, 61; 173/49; 366/116; 318/460; 209/1, 346; 73/666, 667, 672

[56] References Cited

U.S. PATENT DOCUMENTS

| | | | |
|---|---|---|---|
| 3,004,389 | 10/1961 | Muller | 173/49 X |
| 3,076,545 | 2/1963 | Bodine, Jr. | 209/1 |
| 3,232,669 | 2/1966 | Bodine, Jr. | 299/37 |
| 3,468,384 | 9/1969 | Bodine | 173/49 |
| 3,572,139 | 3/1971 | Shatto, Jr. | 74/87 |
| 3,604,520 | 9/1971 | Shatto, Jr. | 173/49 X |
| 3,633,683 | 1/1972 | Shatto, Jr. | 173/49 |
| 3,837,239 | 9/1974 | Bodine | 74/843 |
| 4,168,916 | 9/1979 | Yamada et al. | 366/116 |

FOREIGN PATENT DOCUMENTS

| | | | |
|---|---|---|---|
| 591825 | 2/1978 | U.S.S.R. | 318/460 |

*Primary Examiner*—Allan D. Herrmann

*Attorney, Agent, or Firm*—Townsend and Townsend

[57] ABSTRACT

An oscillator producing vibrations at an operating frequency near, but different from, the resonant frequency of a resonant system is coupled to its input and the resonant system is supported a predetermined distance from its free ringing node(s) at position(s) corresponding to the effective node(s) for the operating frequency. The oscillator is controlled to maintain the operating frequency at a predetermined constant value, which keeps the effective nodes at the same position as the load driven by the output of the resonant system varies.

7 Claims, 5 Drawing Figures

RESONANT SYSTEM SUPPORT

BACKGROUND OF THE INVENTION

This invention relates to a support structure for a resonant system.

It is known to use a resonant system for force amplification. The resonant mode in which a resonant system vibrates depends upon where it is constrained, the frequency of vibrations applied thereto, and its geometry. For example, a straight beam unconstrained at its ends has a fundamental free-free resonant mode in which anti-nodes are formed at the respective ends of the beam and a pair of spaced apart nodes are formed between the ends of the beam. The beam is supported and at least partially constrained at the nodes. Vibrations near the resonant frequency are applied to one end, which serves as the input to the resonant system, and the other end of the beam, which serves as the output of the resonant system, is coupled to a work object—either directly or by means of a tool. Typical examples of such resonant systems are disclosed in Bodine U.S. Pat. Nos. 3,232,669 and 3,837,239.

Resonant systems are most useful in high power applications. The high power applied to the resonant system subjects it to large vibratory forces and displacement, as well as high velocity. In the past, it has been difficult to design node supports that can withstand such an environment. The conventional practice for determining the nodal positions of a resonant system is to apply a force impulse or a small vibrational force at the resonant frequency to its input and to observe the points of minimum vibration in the free ringing state of the resonant system. The resonant system is then held in place by node supports located at the determined points of minimum vibration so that the transfer of vibration energy to the frame is minimized.

Node support of prior resonant systems have proved less advantageous than desired because the node positions of the resonant systems, i.e., the points of minimum vibration, are frequency dependent. The free ringing nodes correspond precisely to the resonant frequency, i.e., the frequency at the peak of the resonant curve. But, for stable operation and to prevent overstressing of the resonant system, vibrations are conventionally applied thereto at a frequency of operation slightly below resonance, i.e., on the lower side of the peak of the resonant curve. As a result, in the conventional practice for determining the nodal positions the resonant system is not supported at its effective nodes for the actual frequency of operation, which subjects the node supports to violent vibrations.

SUMMARY OF THE INVENTION

The present invention provides a node support for a resonant system which is vibratory in a resonant mode at or near a resonant frequency. The resonant system has a vibratory input, and a vibratory output responsive to vibrations at the input. The system has at least one node dependent in position on the frequency of the input vibrations. A frame is attached to the resonant system at the position of the node for a given frequency near but different from the resonant frequency. Vibrations are applied to the input of the resonant system at the given frequency to excite the resonant to vibration in a near resonant mode.

In the apparatus of the present system, the resonant system is supported at its actual resonant nodes where vibration is at an absolute minimum (theoretically zero). As a result, a corresponding minimum of vibrational energy will be transmitted to the supporting frame. Operating frequency of the input vibrations is closely monitored to exactly match the selected input frequency, which keeps the effective nodes at the same position as the load driven by the output of the resonant system varies. Output amplitude can be varied by varying the force applied by the vibratory input.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENT

Figure 1:
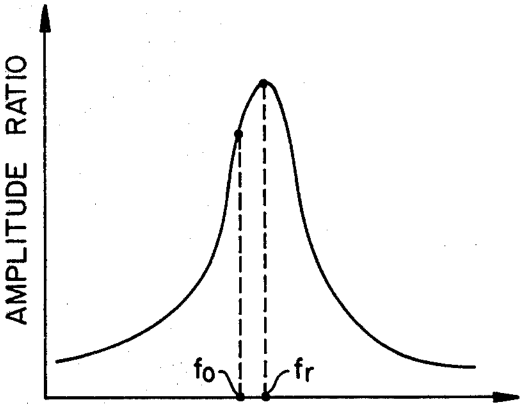
FIG. 1 is a graph representing characteristics of a resonant system.

In FIG. 1 the familiar resonant curve is depicted. The ordinate represents the amplitude amplification of a resonant system, i.e., the ratio of output amplitude to input amplitude, and the abscissa represents frequency. The peak of the resonant curve, i.e., the maximum amplitude amplification, occurs at the resonant frequency, $f_r$. For stable operation, it is common practice to operate on the lower side of the peak, i.e., to apply vibrations to the input of the resonant system at an operating frequency, $f_o$, which is less than $f_r$. The operating frequency $f_o$ is sufficiently far from the resonant frequency $f_r$ so the amplitude at the output of the resonant system does not overstress the resonant system.

The invention is based upon the recognition that the nodal positions of many resonant systems change as a function of frequency. According to the invention such a resonant system is driven at an operating frequency $f_o$ for the desired amplitude and the resonant system is supported at the effective nodal positions for such operating frequency, rather than at the free ringing nodal positions. This substantially reduces the vibrational forces to which the node supports are subjected and better isolates the remainder of the apparatus from the resonant system.

Figure 2:
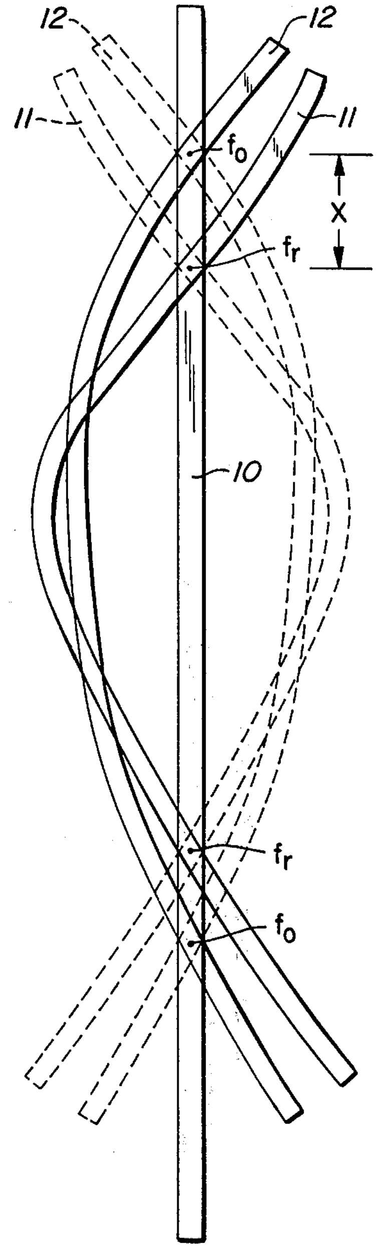
FIG. 2 is a greatly exaggerated diagram of a straight resonant beam depicting standing waves of the beam.

In FIG. 2, the reference numeral 10 represents a straight elongated beam that comprises a distributed mass spring resonant system. For the sake of discussion it is assumed that beam 10 vibrates laterally, i.e., transverse to its length. At the resonant frequency, i.e., the peak amplitude on the resonant curve, beam 10 vibrates with a standing wave pattern about its neutral position between extremes (shown in exaggerated fashion) represented by reference numerals 11 and 11'. (However, the invention is applicable to resonant systems of different configuration, direction of vibration, and modes of vibration). In such resonant mode, beam 10 has three anti-nodes, namely at its ends and at its center, and two nodes, namely between its center and each end. One of the anti-nodes, e.g., the top end of beam 10, serves as the input of the resonant system to which transverse vibrations are applied by an eccentric weight oscillator and one of the anti-nodes, e.g., the bottom end of beam 10, serves as the output of the resonant system adjacent to which a load such as a movable tool or a material to be worked upon, is placed in the path of the transverse vibrations.

Reference numerals 12, 12' represent the extremes of a standing wave pattern of beam 10 in response to vibrations applied to its input at an operating frequency $f_o$ below the resonant frequency $f_r$. Thus, there is a shift in nodal position that is dependent upon the frequency of the vibrations applied to the input of beam 10. The force of the input vibrations has not changed. The distance X in FIG. 2 represents the difference between the upper free ringing node, i.e., the upper nodal position at resonant frequency $f_r$, and the effective upper node at the operating frequency $f_o$, which is somewhat below $f_r$. Beam 10 is supported at the nodal positions designated $f_o$ rather than at the nodal positions designated $f_r$.

Figure 3:
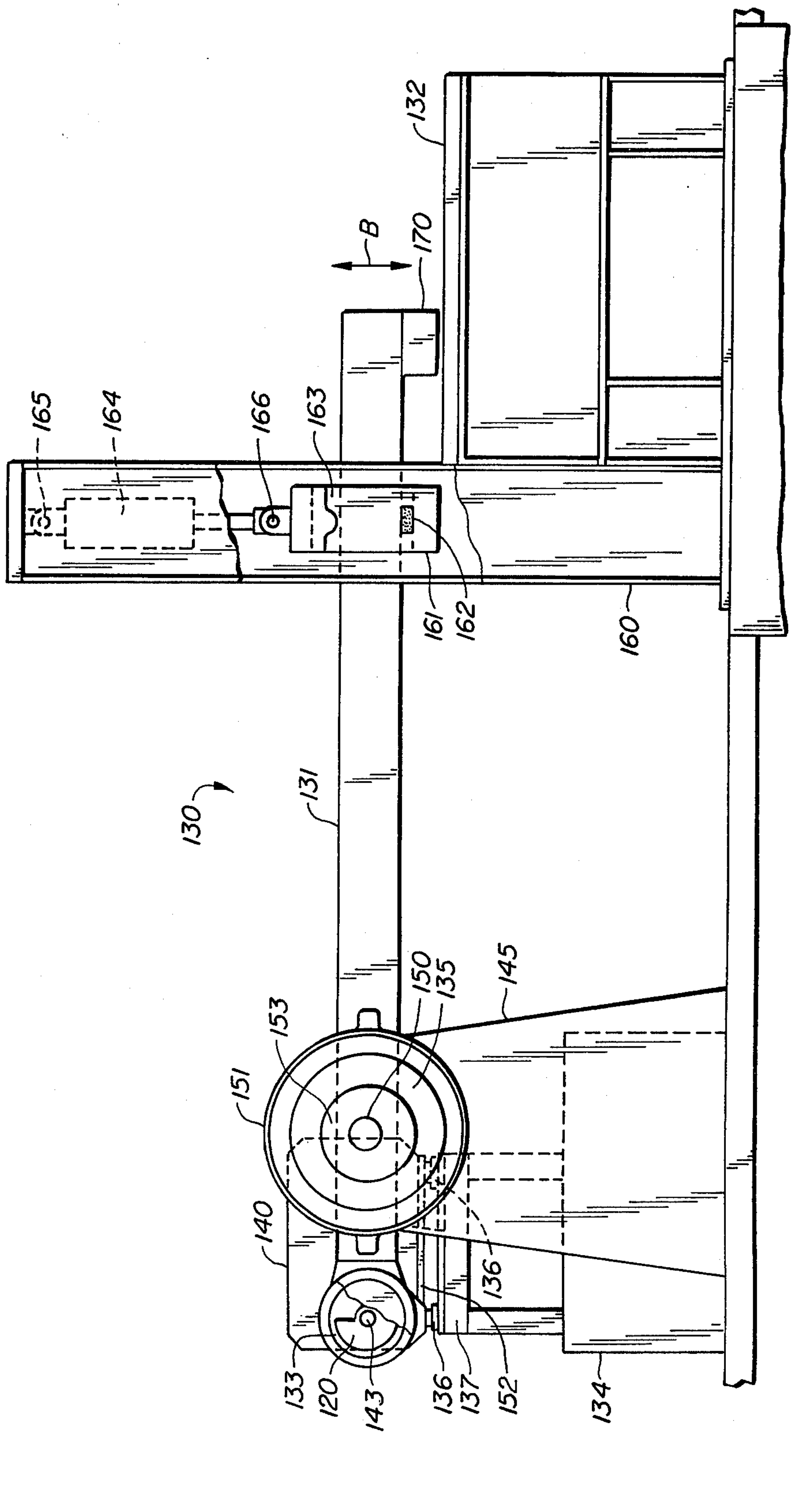
FIG. 3 is a side elevation view of a press incorporating the principles of the invention.
Figure 4:
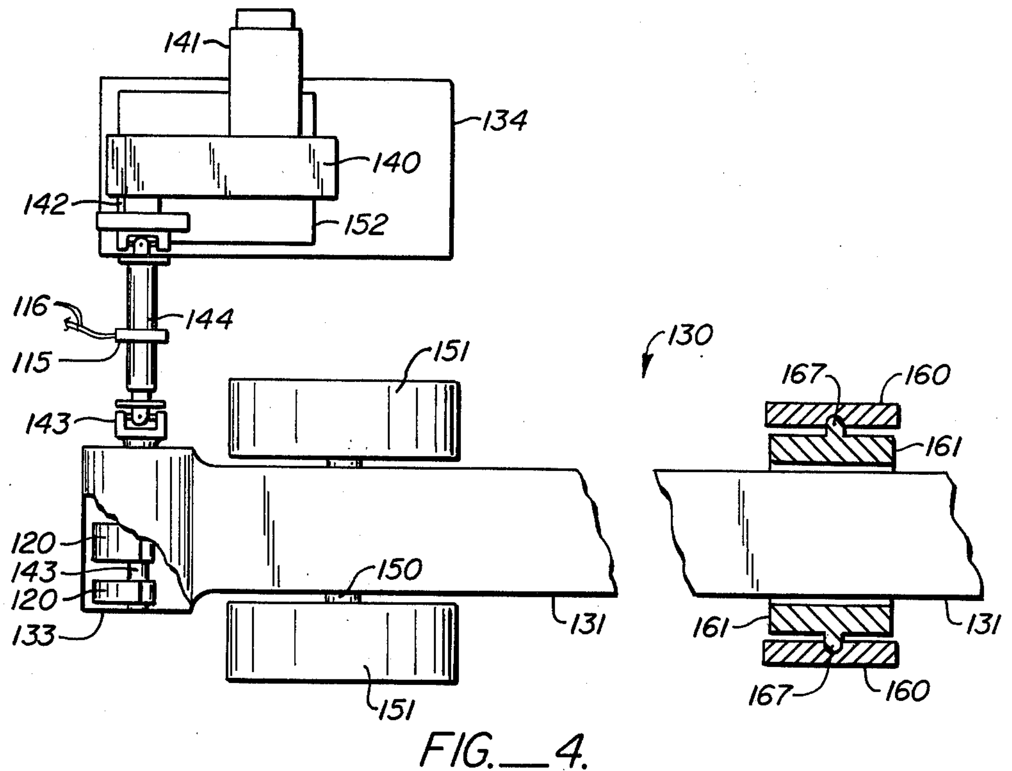
FIG. 4 is a top plan view of part of the press of FIG. 3.

In FIGS. 3 and 4, a press 130 includes a resonant system in the form of a horizontally oriented, straight resonant beam 131 and a work table 132 lying on the floor. A die, compression mold, or other object to be compressed is supported on table 132. Resonant beam 131 has a vibratory input at one end, an output at the other end, which is vibratory in first and second opposite vertical directions represented by an arrow B in FIG. 3 responsive to vibrations at the input, and a pair of spaced apart nodes between the input and the output.

An oscillator 133, which has a housing formed in a one piece construction with beam 131, is coupled to the input of the resonant system. A table 134 lies on the floor adjacent to oscillator 133. A platform 152 is coupled by vibration isolators 136 to the top surface of a pedestal 137 on table 134. A power transmission housing 140 is supported by platform 152. A hydraulic motor 141 is mounted on the side of housing 140. Motor 141 is coupled by a power transmission within housing 140 to a drive shaft 142. Generator 133 has a shaft 143 to which drive shaft 142 is connected by shaft 144. A tachometer 115 having output leads 116 circumscribes shaft 144 to determine its rotational velocity. Oscillator 133 includes a plurality of removable and replaceable eccentric weights 120 mounted on shaft 143. Resonant beam 131 is pivotally carried by a stationary frame 145 lying on the floor.

A shaft 150 is press fitted into a horizontal bore extending through resonant beam 131 transverse to its length at its effective node nearest to oscillator 133. The location of this effective node is a function of the operating frequency of oscillator 133.

A pair of cylindrical housings 151 are attached to frame 145 on either side of resonant beam 131 in concentric relationship with shaft 150. A pair of annular resilient members 152 in the form of pneumatic rubber tires are located inside the respective cylindrical housings 151. Annular resilient members 135 are mounted on pairs of central hubs 153 which are in turn mounted on the ends of shaft 150. Thus, resonant beam 131 is supported by shaft 150 and is pivotable about the axis of the shaft.

A frame 160, which lies on the floor, embraces resonant beam 131 at its effective node nearest the output of the resonant system. A movable rectangular carrier 161 surrounds resonant beam 131 within frame 160. The body of a hydraulic cylinder 164 is connected by a pin 165 to the top of frame 160 and the arm of cylinder 164 is connected by a pin 166 to the top of carrier 161. The sides of carrier 161 have rails 167 that ride in tracks formed on the adjacent surfaces of the inside of frame 160 to guide carrier 161 vertically as the arm of cylinder 164 is extended and retracted.

The output of resonant beam 131 overlies table 132. A hammer 170 is secured to the lower surface of the output of resonant beam 131.

In operation, vibrational force is applied to the input end of resonant beam 131 by oscillator 133 at an operating frequency below the resonant frequency of resonant beam 131. The amount of vibrational force necessary to achieve the desired output amplitude is achieved by varying weights 120. An object to be compressed is placed on table 132 directly under hammer 170 and cylinder 164 is operated to lower carrier 161 until hammer 170 bears against the object to be compressed. Before hammer 170 contacts the object to be compressed, resonant beam 131 rests on resilient pad 162 at the effective node, which holds it against node support 163. After such contact, the reaction of the object to be compressed exerted on hammer 170 forces resonant beam 131 against node support 163. Cylinder 164 applies a unidirectional downward force to beam 131 through node support 163. When the object is fully compressed, cylinder 164 is operated to lift carrier 161 so the compressed object can be removed and a new object to be compressed can be placed under hammer 170. Thereafter, the described cycle is repeated.

The described press substantially reduces the vibrational forces to which the node supports are subjected and better isolates the remainder of the apparatus including table 132, table 134, and frame 145 from resonant beam 131, because resonant beam 131 is supported by shaft 150 and frame 160 at its effective nodes corresponding to the operating frequency, rather than at its free ringing nodes. (The more critical node support in this regard is the one including shaft 150.) In a typical embodiment resonant beam 131 is 4 inches thick in the direction of vibration, 12 inches wide, and 9 and ½ feet long from end to end, weighs approximately 1800 pounds including oscillator 133 and hammer 170, and has a modulus of elasticity of approximately 30 million psi. The oscillator has eccentric weight providing a moment of 64.01 lb.-in. Such a beam has a resonant frequency of approximately 58 Hz and a free ringing node nearest to the oscillator that is approximately 18 inches from the center of the shaft of such oscillator.

For an operating frequency of 48.0 Hz, the peak-to-peak vibrational amplitude at the output of the described beam is 1.4 inches, and its effective node nearest to the oscillator is 12 inches from the center of the shaft of the oscillator, i.e., approximately 6 inches from the free ringing node. At an operating frequency of 46.6 Hz, peak-to-peak vibrational amplitude is 0.8 inch, and the effective node is 9 and ¾ inches from the center of the shaft of the oscillator. At an operating frequency of 44.6 Hz, peak-to-peak vibrational amplitude is 0.5 inches and the effective node is 6 and ½ inches from the center of the shaft of the oscillator. Thus, a decrease in operating frequency of about 7% causes an almost 6 inch movement of the node position.

While operating frequency has a dramatic effect on the position of the node nearest the oscillator, input force has little or no effect. For the same beam, operated at 48 Hz but with an input moment of 49.48 lb.-in. output amplitude is decreased to 0.8 in., but the node remains at 12 inches from the centerline of the oscillator.

It has been found that the vibrational amplitude, and thus the operating frequency, tends to vary as a function of the load driven by the output of a resonant system. Specifically as the load increases, the vibratory amplitude drops off sharply, and the operating frequency decreases. As the frequency drops, the effective nodes of the resonant system shift. The extent of this shift is illustrated by the embodiment described in the preceding paragraph. In order to prevent the effective nodes of resonant beam 131 from shifting, oscillator 133 is incorporated in a control system for maintaining the operating frequency of the vibrations applied to the input of resonant beam 131 at a predetermined constant value, which holds the effective nodes at the same position in the face of a changing load.

Figure 5:
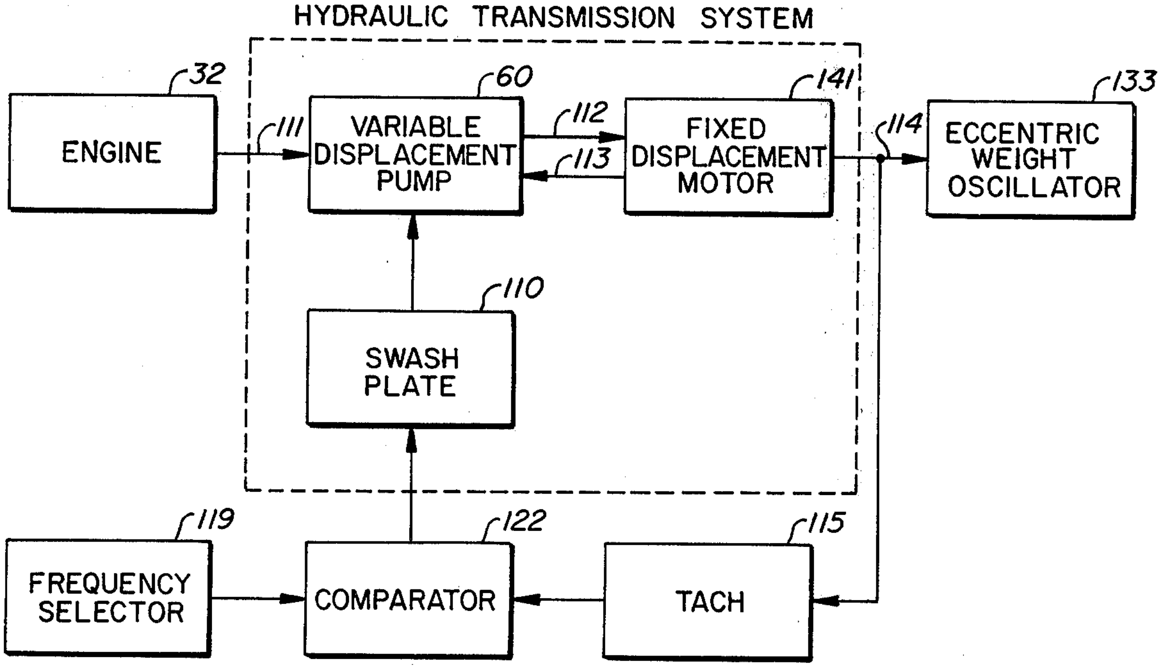
FIG. 5 is a schematic block diagram of the system for driving the oscillator of FIG. 3.

In FIG. 5, an engine 32, oscillator 133, motor 141, and a pump 60 are represented in schematic block form. Pump 60 is preferably a variable displacement axial piston pump having a swash plate 110, the angular position of which determines the displacement of pump 60. The drive shaft of engine 32 is connected to the input shaft of pump 60 as represented by a line 111. Fluid supply and return lines 112 and 113, respectively, are connected between pump 60 and motor 141, which is preferably a fixed displacement axial piston motor. The output shaft of motor 141 is connected to the shaft of oscillator 133 as represented by a line 114.

Tachometer (TACH) 115 is coupled to the connection between motor 141 and oscillator 133. The output of tachometer 115 is an electrical signal representative of the operational frequency of oscillator 133. For the embodiment set forth above, if the desired vibrational amplitude is 1.4 inches, the constant predetermined frequency would be 48.0 Hz. The electrical output signal from tachometer 115 is applied to comparator 122 to determine deviation of the operational frequency from a predetermined constant value set manually in frequency selector 119.

The effective nodal positions of the resonant system are dependent upon its operational frequency. Comparator 122 senses changes in the frequency of vibration and adjusts swash plate 110 to nullify such changes and accordingly nullifies changes in the position of the effective nodes. When the output of the resonant system encounters an excessive load, its vibrational amplitude and frequency tend to drop, assuming the operational frequency is below the resonant frequency, as required for stable operation, the decrease in operational frequency is sensed by comparator 122 and swash plate 110 adjusts pump 60 to draw more power from engine 32 and maintain motor 141 at the predetermined constant value of frequency, which maintains the effective nodes at the position of the node supports.

The described embodiment of the invention is only considered to be preferred and illustrative of the inventive concept; the scope of the invention is not to be restricted to such embodiment. Various and numerous other arrangements may be devices by one skilled in the art without departing from the spirit and scope of this invention. For example, if the load driven by the output of the resonant system does not vary greatly, the described control system can be eliminated. Instead of employing transverse vibration, the resonant system could employ longitudinal or torsional vibration such as disclosed in Bodine U.S. Pat. Nos. 3,367,716 and 3,837,239. Further the resonant system could have a different configuration, such as that disclosed in Shatto U.S. Pat. No. 3,563,316, or a different mode of vibration, such as that disclosed in Shatto U.S. Pat. No. 3,572,139.

What is claimed is:

1. Resonant work performing apparatus comprising:

a resonant system that is vibratory in a free ringing resonant mode at a resonant frequency, the resonant system having a vibratory input, a vibratory output responsive to vibrations at the input, and at least one effective node dependent in position upon the effective frequency of such input vibrations;

means for applying vibrations to the input of the resonant system at a given frequency near but different from the free ringing resonant frequency to excite the resonant system to vibration in a near resonant mode; and a frame attached to the resonant system at the position of the effective node for said given frequency so that the transfer of vibration energy from the resonant system to the frame is minimized.

2. The apparatus of claim 1, in which the applying means includes means for maintaining the vibrations applied to the input of the resonant system at the given frequency as the load applied to the output of the resonant system varies, thereby maintaining the position of the node constant.

3. The apparatus of claim 1, in which the force applied by the vibratory input is variable to control the amplitude of the output.

4. The apparatus of claim 3, in which the vibratory input is an eccentric weight oscillator having replaceable weights to vary the force applied by the oscillator.

5. The apparatus of claim 1, in which the resonant system is a distributed mass-spring system.

6. The apparatus of claim 5, in which the distributed mass-spring system is a straight beam resonant in a free-free transverse mode, the input being at one end of the beam, the output being at the other end of the beam, and two nodes being spaced apart between the ends of the beam.

7. The apparatus of claim 1, additionally comprising a tool and means for mounting the tool on the frame for reciprocation adjacent to the output of the resonant system.

* * * * *